US008226794B2

(12) United States Patent
Fogle

(10) Patent No.: US 8,226,794 B2

(45) Date of Patent: Jul. 24, 2012

(54) REINFORCED CARTON AND METHODS OF MAKING CARTON BLANKS

(75) Inventor: James C. Fogle, Marietta, GA (US)

(73) Assignee: Graphic Packaging International, Inc., Marietta, GA (US)

( * ) Notice: Subject to any disclaimer, the term of this patent is extended or adjusted under 35 U.S.C. 154(b) by 48 days.

(21) Appl. No.: 12/545,399

(22) Filed: Aug. 21, 2009

(65) Prior Publication Data

US 2010/0000672 A1 Jan. 7, 2010

Related U.S. Application Data

(63) Continuation of application No. PCT/US2008/054875, filed on Feb. 25, 2008.

(60) Provisional application No. 60/903,137, filed on Feb. 23, 2007.

(51) Int. Cl.
*B65B 9/25* (2006.01)
*C09J 5/00* (2006.01)

(52) U.S. Cl. ......................... 156/324; 156/253; 156/270

(58) Field of Classification Search .................. 156/250, 156/252, 263, 264, 270, 543, 556, 574, 577, 156/253, 257, 268, 525, 526, 575, 324, 324.4; 427/428.01, 428.11
See application file for complete search history.

(56) References Cited

U.S. PATENT DOCUMENTS 499,655 A 6/1893 Clark
1,145,668 A 7/1915 Brown
1,478,791 A 12/1923 Nelson
1,503,161 A 7/1924 Hornecker
1,564,374 A 12/1925 Smith
1,634,073 A 6/1927 LaBombarde
1,656,919 A 1/1928 Marsh
1,762,703 A 6/1930 Smith
1,762,704 A 6/1930 Smith
1,772,625 A 8/1930 Caulfield
1,844,751 A 2/1932 Freedman et al.
1,869,751 A 8/1932 Iacobitti
1,901,483 A 3/1933 Ware, Jr.
1,911,215 A 5/1933 Walter
1,925,102 A 9/1933 Levkoff
1,951,408 A 3/1934 Haven
1,971,863 A 8/1934 Lupton
2,005,924 A 6/1935 Wilson
2,006,203 A 6/1935 Leslie
2,027,079 A 1/1936 Weiss (Continued)

FOREIGN PATENT DOCUMENTS

CH 692649 9/2002

(Continued)

OTHER PUBLICATIONS

PCT/US2008/054875—International Search Report and Written Opinion.

(Continued)

*Primary Examiner* — Linda L Gray

(74) *Attorney, Agent, or Firm* — Womble Carlyle Sandridge & Rice, LLP

(57) ABSTRACT

A carton is constructed from a multi-ply blank including an exterior blank and an interior blank. Adhesive is applied to the exterior blank using an applicator capable of transverse movement and/or rotation.

21 Claims, 6 Drawing Sheets

U.S. PATENT DOCUMENTS 2,098,818 A 11/1937 Andrews
2,141,743 A 12/1938 Ethridge
2,145,430 A 1/1939 New
2,152,079 A 3/1939 Mott
2,196,243 A 4/1940 Bensel
2,290,971 A 7/1942 King
2,330,294 A 9/1943 Leavitt et al.
2,343,222 A 2/1944 Nelson
2,345,486 A 3/1944 Nathan
2,346,134 A 4/1944 Kirkland et al.
2,348,377 A 5/1944 Goodyear
2,355,665 A 8/1944 Mabee
2,365,159 A 12/1944 Walton
2,383,853 A 8/1945 Guyer
2,407,781 A 9/1946 Guyer
2,407,802 A 9/1946 Stotter
2,416,332 A 2/1947 Lehman
2,437,926 A 3/1948 Ball
2,502,117 A 3/1950 Anderson
2,576,594 A 11/1951 Goldstein
2,643,589 A 6/1953 Weiss
2,679,349 A 5/1954 Mullinix
2,701,679 A 2/1955 Goldstein
2,706,076 A 4/1955 Guyer
2,710,134 A 6/1955 Schroeder et al.
2,775,393 A 12/1956 Rugg
2,778,557 A 1/1957 Moore
2,791,362 A 5/1957 Nute
2,810,506 A 10/1957 Kessler
2,848,151 A 8/1958 O'Neil
2,868,433 A 1/1959 Anderson, Jr.
2,875,938 A 3/1959 Bramhill
2,933,228 A 4/1960 Guyer
2,934,251 A 4/1960 Kramer
2,944,726 A 7/1960 McCauley
2,955,739 A 10/1960 Collura
2,967,610 A 1/1961 Ebert et al.
2,973,086 A 2/1961 Ball
2,993,632 A 7/1961 De Feo
3,002,613 A 10/1961 Merkel et al.
3,021,002 A 1/1962 Reynolds
3,033,362 A 5/1962 Marcalus
3,048,324 A 8/1962 Anderson
3,090,483 A 5/1963 Altree et al.
3,092,301 A 6/1963 Selle
3,094,266 A 6/1963 Deering
3,112,856 A 12/1963 MacIntosh et al.
3,116,866 A 1/1964 Boran
3,137,437 A 6/1964 Svensson
3,157,342 A 11/1964 Grady
3,158,312 A 11/1964 Simkins
3,159,326 A 12/1964 Stonebanks
3,184,136 A 5/1965 Forbes, Jr.
3,189,251 A 6/1965 McFarland
3,265,283 A 8/1966 Farquhar
3,276,665 A 10/1966 Rasmussen
3,280,968 A 10/1966 Craine
3,355,089 A 11/1967 Champlin
3,363,822 A 1/1968 Maulini et al.
3,414,182 A 12/1968 Fobiano
3,417,911 A 12/1968 Hennessey
3,426,955 A 2/1969 Olson
3,434,648 A 3/1969 Barry, Jr.
3,443,971 A 5/1969 Wood
3,561,667 A 2/1971 Saltman
3,574,040 A * 4/1971 Chitwood .................... 156/522
3,621,628 A 11/1971 Chidsey, Jr.
3,640,447 A 2/1972 Forbes, Jr. et al.
3,653,495 A 4/1972 Gray
3,669,345 A 6/1972 Cole
3,677,458 A 7/1972 Gosling
3,680,766 A 8/1972 Collura et al.
3,690,544 A 9/1972 Meyers
3,744,702 A 7/1973 Ellison
3,750,538 A 8/1973 Confer
3,768,719 A 10/1973 Johnson
3,786,914 A 1/1974 Beutler
3,831,836 A 8/1974 Ellison et al.
3,880,341 A 4/1975 Bamburg et al.
3,884,348 A 5/1975 Ross
3,891,137 A 6/1975 Ellison
3,905,646 A 9/1975 Brackmann et al.
3,943,378 A 3/1976 Beutler
3,951,333 A 4/1976 Forbes, Jr. et al.
3,981,430 A 9/1976 Keim
4,008,849 A 2/1977 Baber
4,015,768 A 4/1977 McLennan
4,027,794 A 6/1977 Olson
4,036,423 A 7/1977 Gordon
4,046,307 A 9/1977 Booth et al.
4,059,220 A 11/1977 Lorenz
4,095,735 A 6/1978 Stone
4,113,100 A 9/1978 Soja et al.
4,141,485 A 2/1979 Lambert
4,165,030 A 8/1979 Bunger et al.
4,168,003 A 9/1979 Wysocki
4,194,677 A 3/1980 Wysocki
4,262,816 A 4/1981 Margulies
4,308,956 A 1/1982 Steinke et al.
4,328,923 A 5/1982 Graser
4,341,338 A 7/1982 Arnold
4,344,537 A 8/1982 Austin
4,345,393 A 8/1982 Price et al.
4,371,109 A 2/1983 Tanner et al.
4,378,905 A 4/1983 Roccaforte
4,380,314 A 4/1983 Langston, Jr. et al.
4,458,810 A 7/1984 Mahoney
4,484,683 A 11/1984 Werner, Jr.
4,498,619 A 2/1985 Roccaforte
4,508,218 A 4/1985 Focke et al.
4,512,476 A 4/1985 Herrington, Jr.
4,519,538 A 5/1985 Omichi
4,546,914 A 10/1985 Roccaforte
4,548,318 A 10/1985 Boyle
4,558,785 A 12/1985 Gordon
4,566,593 A 1/1986 Muller
4,572,423 A 2/1986 Spencer
4,586,643 A 5/1986 Halabisky et al.
4,588,084 A 5/1986 Holley, Jr.
4,608,038 A 8/1986 Virta et al.
4,645,108 A 2/1987 Gavin et al.
4,676,394 A 6/1987 Hiersteiner
4,742,917 A 5/1988 Bornwasser
4,746,019 A 5/1988 Prater
4,760,952 A 8/1988 Wachter
4,768,703 A 9/1988 Sosler et al.
4,773,541 A 9/1988 Riddell
4,778,057 A 10/1988 Allen et al.
4,781,317 A 11/1988 Ditto
4,793,550 A 12/1988 Gottlieb
5,181,650 A 1/1989 Kilgerman
4,804,138 A 2/1989 McFarland
4,815,609 A 3/1989 Kiedaisch
4,863,052 A 9/1989 Lambert
4,865,187 A 9/1989 Zulauf et al.
4,886,160 A 12/1989 Kligerman
642,121 A 1/1990 Hildreth
4,905,898 A 3/1990 Wade
4,909,395 A 3/1990 Weissman
4,911,777 A 3/1990 Truc et al.
4,913,292 A 4/1990 Field
4,919,269 A 4/1990 Wright et al.
4,946,093 A 8/1990 Moorman
4,946,540 A 8/1990 Mitchard
4,948,033 A 8/1990 Halsell, II et al.
4,989,735 A 2/1991 O'Brien
5,012,929 A 5/1991 Roosa
5,012,959 A 5/1991 Gordon
5,020,337 A 6/1991 Krieg
5,050,742 A 9/1991 Muckenfuhs
5,069,359 A 12/1991 Liebel
5,071,010 A 12/1991 Carufel/Zeman
5,072,876 A 12/1991 Wilson
5,083,667 A 1/1992 Holder
5,092,516 A 3/1992 Kastanek
5,094,359 A 3/1992 DeMars et al.
5,098,757 A * 3/1992 Steel ............................ 428/34.2

| | | | |
|---|---|---|---|
| 5,125,568 | A | 6/1992 | Bauer |
| 5,129,875 | A | 7/1992 | Chaygneaud-Dupuy |
| 5,141,150 | A | 8/1992 | Plaessmann |
| 5,222,660 | A | 6/1993 | Koss |
| 5,238,181 | A | 8/1993 | Mahler |
| 5,251,808 | A | 10/1993 | Rudd |
| 5,285,956 | A | 2/1994 | Piepho |
| 5,292,058 | A | 3/1994 | Zoss et al. |
| 5,328,091 | A | 7/1994 | Koss |
| 5,347,865 | A | 9/1994 | Mulry et al. |
| 5,356,022 | A | 10/1994 | Tipps |
| 5,373,960 | A | 12/1994 | Gunn et al. |
| 5,386,937 | A | 2/1995 | Crawford |
| 5,429,297 | A | 7/1995 | Walsh |
| 5,450,680 | A | 9/1995 | Bromberg |
| 5,495,727 | A | 3/1996 | Strong et al. |
| 5,505,372 | A | 4/1996 | Edson et al. |
| 5,544,806 | A | 8/1996 | Anderson et al. |
| 5,551,938 | A | 9/1996 | Stone |
| 5,582,343 | A | 12/1996 | Dalvey |
| 5,584,430 | A | 12/1996 | Mulry |
| 5,588,585 | A | 12/1996 | McClure |
| 5,599,267 | A | 2/1997 | Dupuy |
| 5,601,521 | A | 2/1997 | Xapelli |
| 5,632,402 | A | 5/1997 | Walsh et al. |
| 5,632,404 | A | 5/1997 | Walsh |
| 5,639,017 | A | 6/1997 | Fogle |
| 5,678,755 | A | 10/1997 | Block |
| 5,699,957 | A | 12/1997 | Blin et al. |
| 5,709,766 | A | 1/1998 | Press et al. |
| 5,746,871 | A | 5/1998 | Walsh |
| 5,757,930 | A | 5/1998 | Seidemann et al. |
| 5,775,576 | A | 7/1998 | Stone |
| 5,783,030 | A | 7/1998 | Walsh |
| 5,794,778 | A | 8/1998 | Harris |
| 5,794,811 | A | 8/1998 | Walsh |
| 5,794,812 | A | 8/1998 | Walsh |
| 5,810,250 | A | 9/1998 | Stone et al. |
| 5,826,783 | A | 10/1998 | Stout |
| 5,842,576 | A | 12/1998 | Snow |
| 5,857,570 | A | 1/1999 | Brown |
| 5,857,614 | A | 1/1999 | Walsh |
| 5,873,515 | A | 2/1999 | Dunn et al. |
| 5,881,884 | A | 3/1999 | Podosek |
| 5,893,513 | A | 4/1999 | Stone et al. |
| 5,915,546 | A | 6/1999 | Harrelson |
| 5,918,799 | A | 7/1999 | Walsh |
| 5,921,398 | A | 7/1999 | Carroll |
| 5,927,498 | A | 7/1999 | Saam |
| 5,960,555 | A | 10/1999 | Deaton et al. |
| 5,967,374 | A | 10/1999 | Baker |
| 5,979,749 | A | 11/1999 | Bozich |
| 5,992,733 | A | 11/1999 | Gomes |
| 5,996,797 | A | 12/1999 | Flaig |
| D419,440 | S | 1/2000 | Hansen |
| 6,015,084 | A | 1/2000 | Mathieu et al. |
| 6,027,017 | A | 2/2000 | Kuhn et al. |
| 6,059,182 | A | 5/2000 | Wein |
| 6,065,590 | A | 5/2000 | Spivey |
| 6,102,277 | A | 8/2000 | Krapohl, Sr. |
| 6,110,095 | A | 8/2000 | Finke et al. |
| 6,129,211 | A | 10/2000 | Prakken et al. |
| 6,131,729 | A | 10/2000 | Eckermann et al. |
| 6,135,289 | A | 10/2000 | Miller |
| 6,145,736 | A | 11/2000 | Ours et al. |
| 6,158,653 | A | 12/2000 | Kanter et al. |
| 6,164,526 | A | 12/2000 | Dalvey |
| 6,189,777 | B1 | 2/2001 | Hutchinson et al. |
| 6,221,192 | B1 | 4/2001 | Walsh |
| 6,230,881 | B1 | 5/2001 | Collura |
| 6,332,488 | B1 | 12/2001 | Walsh |
| 6,352,096 | B1 | 3/2002 | Walsh |
| 6,364,202 | B1 | 4/2002 | Zelley |
| 6,386,369 | B2 | 5/2002 | Yuhas et al. |
| 6,419,152 | B1 | 7/2002 | Tokarski |
| 6,435,402 | B1 | 8/2002 | Hengami |
| 6,478,159 | B1 | 11/2002 | Taylor et al. |
| 6,510,982 | B2 | 1/2003 | White |
| 6,523,692 | B2 | 2/2003 | Gregory |
| 6,568,586 | B1 | 5/2003 | VanEsley |
| 6,631,803 | B2 | 10/2003 | Rhodes et al. |
| 6,689,034 | B2 | 2/2004 | Walsh |
| 6,713,661 | B1 | 3/2004 | Arndt et al. |
| 6,729,475 | B2 | 5/2004 | Yuhas et al. |
| 6,761,269 | B2 | 7/2004 | Hamming |
| 6,854,639 | B2 | 2/2005 | Walsh |
| 6,869,009 | B2 | 3/2005 | Sutherland et al. |
| 6,889,892 | B2 | 5/2005 | Walsh et al. |
| 6,905,027 | B2 | 6/2005 | Galter |
| 6,913,189 | B2 | 7/2005 | Oliff et al. |
| 6,918,487 | B2 | 7/2005 | Harrelson |
| 6,926,193 | B2 | 8/2005 | Smalley |
| 6,948,293 | B1 | 9/2005 | Eckermann et al. |
| 6,997,316 | B2 | 2/2006 | Sutherland |
| 7,021,468 | B2 | 4/2006 | Cargile, Jr. |
| 7,025,504 | B2 | 4/2006 | Olin |
| 7,201,714 | B2 | 4/2007 | Zoeckler et al. |
| 7,407,087 | B2 | 8/2008 | DeBusk et al. |
| 7,658,318 | B2 | 2/2010 | Walsh et al. |
| 7,699,215 | B2 | 4/2010 | Spivey, Sr. |
| 7,717,322 | B2 | 5/2010 | Walsh et al. |
| 7,762,394 | B2 | 7/2010 | Bradford et al. |
| 2001/0048022 | A1 | 12/2001 | Zoeckler |
| 2002/0022560 | A1 | 2/2002 | Zoeckler |
| 2002/0036153 | A1 | 3/2002 | Yang |
| 2002/0055429 | A1 | 5/2002 | Walsh |
| 2002/0060240 | A1 | 5/2002 | Walsh |
| 2002/0170845 | A1 | 11/2002 | Oliff |
| 2003/0144121 | A1 | 7/2003 | Walsh et al. |
| 2003/0226879 | A1 | 12/2003 | Auclair et al. |
| 2004/0007614 | A1 | 1/2004 | Saulas |
| 2004/0226989 | A1 | 11/2004 | Cook et al. |
| 2004/0241328 | A1 * | 12/2004 | Bradatsch et al. ............ 427/356 |
| 2005/0092649 | A1 | 5/2005 | Ford et al. |
| 2005/0103681 | A1 | 5/2005 | Aubry et al. |
| 2005/0109827 | A1 | 5/2005 | Martin |
| 2005/0133579 | A1 | 6/2005 | Smorch et al. |
| 2005/0167291 | A1 | 8/2005 | Sutherland |
| 2005/0187087 | A1 | 8/2005 | Walsh |
| 2005/0218203 | A1 | 10/2005 | Harrelson |
| 2006/0049067 | A1 | 3/2006 | McDonald |
| 2006/0243783 | A1 | 11/2006 | Spivey, Sr. et al. |
| 2006/0255105 | A1 | 11/2006 | Sweet |
| 2006/0255107 | A1 | 11/2006 | Wright |
| 2006/0266810 | A1 | 11/2006 | Foushee |
| 2006/0266815 | A1 | 11/2006 | Coltri-Johnson et al. |
| 2006/0273143 | A1 | 12/2006 | Finch |
| 2007/0000984 | A1 | 1/2007 | McClure |
| 2007/0051781 | A1 | 3/2007 | Holley, Jr. |
| 2007/0080199 | A1 | 4/2007 | Sutherland |
| 2007/0131749 | A1 | 6/2007 | Coltri-Johnson et al. |

FOREIGN PATENT DOCUMENTS

| | | | |
|---|---|---|---|
| DE | 1091851 | | 10/1960 |
| DE | 2 320 190 | | 4/1973 |
| DE | 29 23 455 | | 6/1979 |
| DE | 81 10 323.9 | | 4/1981 |
| DE | 87 08 078.8 | | 6/1987 |
| DE | 3627019 | | 2/1988 |
| DE | 8908393 | | 9/1989 |
| DE | 94 13 813 | U1 | 8/1994 |
| DE | 29703082 | | 2/1997 |
| DE | 298 17 195 | U1 | 9/1998 |
| DE | 20216854 | U1 | 11/2002 |
| DE | 102005005500 | | 3/2006 |
| DE | 102005053561 | | 3/2006 |
| EP | 0079155 | | 5/1983 |
| EP | 0133595 | | 6/1984 |
| EP | 0542449 | | 5/1993 |
| EP | 0704386 | | 3/1996 |
| EP | 1457425 | | 9/2004 |
| EP | 08010412/1995176 | | 11/2008 |
| FR | 1379931 | | 12/1963 |
| FR | 2699150 | | 12/1992 |
| FR | 2686316 | | 7/1993 |
| FR | 2755670 | | 5/1998 |
| FR | 2882032 | | 8/2006 |
| GB | 104445 | | 6/1916 |

| | | |
|---|---|---|
| GB | 1218016 | 4/1967 |
| GB | 1242356 | 1/1969 |
| GB | 1489963 | 10/1975 |
| GB | 1584066 | 2/1981 |
| GB | 2275913 | 9/1994 |
| GB | 2361000 | 10/2001 |
| GB | 2363372 | 12/2001 |
| GB | 2379923 | 3/2003 |
| JP | 44-25911 | 10/1969 |
| JP | 59-181025 | 12/1984 |
| JP | 123729 | 8/1989 |
| JP | 03114508 | 11/1992 |
| JP | 6-12319 | 1/1994 |
| JP | 0813282 | 12/1997 |
| JP | 53-39118 | 3/2010 |
| WO | WO 02/01606 | 2/1992 |
| WO | WO 95/28325 | 10/1995 |
| WO | WO 98/31593 | 4/1997 |
| WO | WO 97/27114 | 7/1997 |
| WO | WO 02/11516 | 2/2002 |
| WO | WO 03/051622 | 6/2003 |
| WO | WO 03/082686 | 9/2003 |
| WO | WO 2004/063031 | 7/2004 |
| WO | WO 2006/133401 | 4/2006 |
| WO | WO 2007/089282 | 9/2007 |

OTHER PUBLICATIONS

Communication regarding partial ISR for Application No. PCTUS20070011906.

ISR—WO for Application No. PCTUS2008071307.

ISR—WO for Application No. PCTUS2006039865.

EP Search Report for Application No. EP 0801412.8, Oct. 22, 2008.

* cited by examiner

REINFORCED CARTON AND METHODS OF MAKING CARTON BLANKS

CROSS-REFERENCE TO RELATED APPLICATIONS

This application is a continuation application of prior PCT Application No. PCT/US2008/054875, filed Feb. 25, 2008, entitled "Reinforced Carton and Methods of Making Carton Blanks," which PCT application claims the benefit of U.S. Provisional Application No. 60/903,137, filed Feb. 23, 2007. The entire disclosures of both PCT Application No. PCT/US2008/054875 and U.S. Provisional Application No. 60/903,137 are incorporated herein by reference as if set forth in their entireties.

BACKGROUND

This disclosure generally relates to a method of forming a multi-ply blank and a system for applying adhesive to a blank.

SUMMARY

According to an exemplary embodiment of the disclosure, a method of forming a multi-ply blank comprises moving a first blank along a first direction, and applying adhesive to the first blank with a first applicator. The first applicator is moved along a second direction that is nonparallel with the first direction as the adhesive is applied. The method comprises joining a second blank to the first blank to form a multi-ply blank.

In another aspect, the disclosure is generally directed to a method of forming a multi-ply blank. The method comprising providing a first blank and applying adhesive to the first blank with a first applicator. The first applicator is moved and rotated as the adhesive is applied. The method comprises joining a second blank to the first blank to form a multi-ply blank.

In another aspect, the disclosure is generally directed to a system for applying adhesive to a blank. The system comprises a movable surface, the movable surface being capable of moving at least one first blank along a first direction. The system comprises a first adhesive applicator mounted above the movable surface. The first adhesive applicator is capable of movement in a second direction nonparallel with the first direction.

Those skilled in the art will appreciate the above stated advantages and other advantages and benefits of various additional embodiments reading the following detailed description with reference to the below-listed drawing figures.

BRIEF DESCRIPTION OF THE DRAWING FIGURES

According to common practice, the various features of the drawings discussed below are not necessarily drawn to scale. Dimensions of various features and elements in the drawings may be expanded or reduced to more clearly illustrate the disclosed embodiments.

DETAILED DESCRIPTION

Briefly described, the present embodiments are directed to a carton formed from a multi-ply blank and a method for forming the multi-ply carton blank. The multi-ply blank is formed from an exterior blank reinforced with one or more interior reinforcing blanks adhered to an interior surface of the exterior blank. The carton may be separated into separate sections using overlapping tear strips formed in the individual plies of the blank. The tear strip can have longitudinally and obliquely extending portions that are adhered together so that the tear strip sections in the individual blank plies tear together. The tear strip sections in the separate blank plies can be adhered in an adhesive application process in which the adhesive applicator moves transverse to a direction of travel of a first blank ply and/or rotates.

In this specification, the terms "bottom," "side," "end" and "top" are used for general reference purposes to indicate orientations determined in relation to fully erected cartons placed in upright configurations, and are not intended to limit the scope of the disclosure. When used to describe panels, the terms "bottom," "side," "end" and "top" are not intended to convey any relative size differences between the panels.

Figure 1:
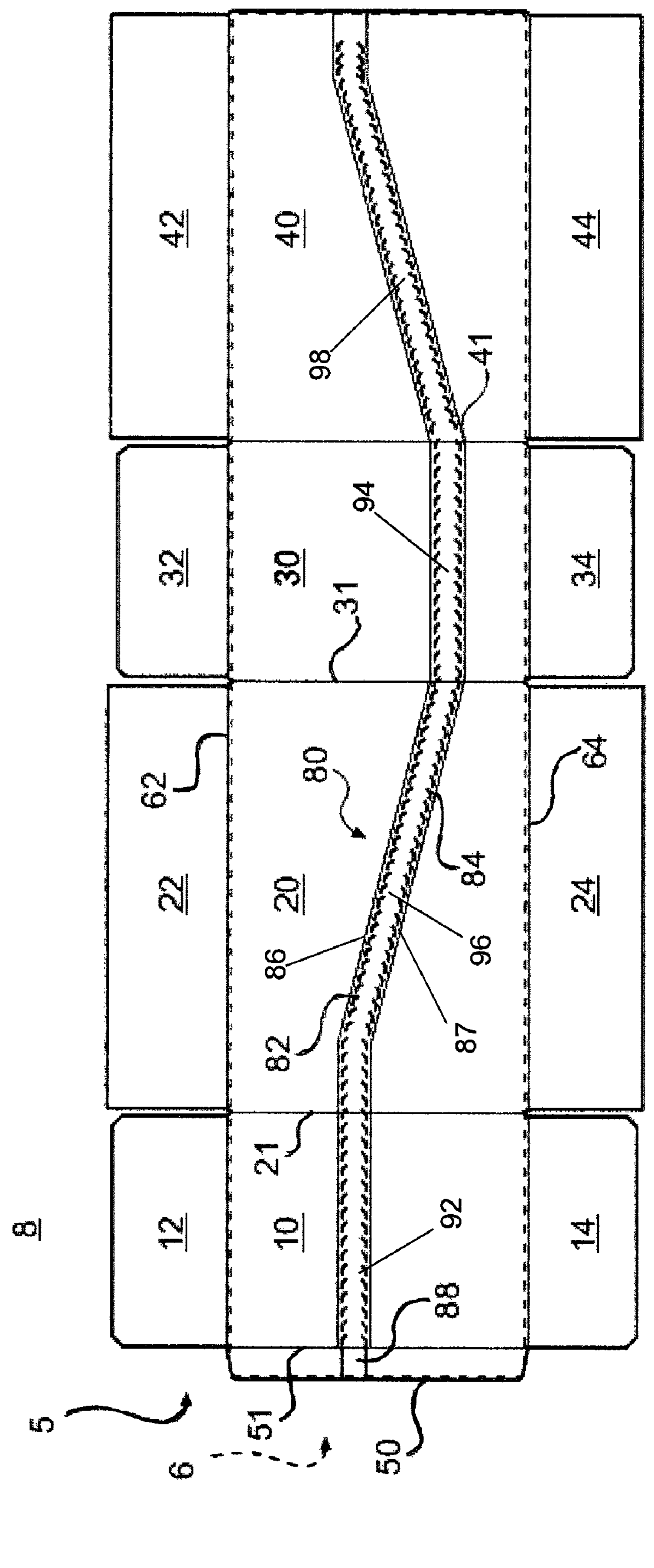
FIG. 1 is a plan view of an exterior side of multi-ply blank used to form a carton according to a first embodiment.

FIG. 1 is a plan view of the exterior side of a multi-ply blank 8 used to form a carton 190 (illustrated in FIGS. 4 and 5) according to a first embodiment. The multi-ply blank 8 is formed from a first, exterior blank 5 and a second, interior or reinforcing blank 6 adhered, laminated or otherwise adhered to the exterior blank 5. The exterior surface or print surface of the exterior blank 5 is visible in FIG. 1, and the interior blank 6 is joined to the opposite, interior, or underside of the exterior blank 5. The interior blank 6 is not visible in FIG. 1 and the outline of the interior blank 6 is therefore indicated by dashed lines in FIG. 1.

The blank 8 is "multi-ply" in the sense that the exterior and interior blank plies 5 and 6 comprising the blank 8 include substantial overlapping portions. The terms "two-ply" and "multi-ply" do not indicate that all sections of the multi-ply blank 8 are formed from two or more plies. For example, the exterior blank 5 and the interior blank 6 have different perimeters or "footprints" and do not overlap at all points.

Referring to FIG. 1, the exterior blank 5 comprises a first end panel 10 foldably connected to a first side panel 20 at a first transverse fold line 21, a second end panel 30 foldably connected to the first side panel 20 at a second transverse fold line 31, and a second side panel 40 foldably connected to the second end panel 30 at a third transverse fold line 41. An adhesive flap 50 can be foldably connected to the first end panel 10 at a fourth transverse fold line 51.

The first end panel 10 is foldably connected to a first end top flap 12 and a first end bottom flap 14. The first side panel 20 is foldably connected to first side top flap 22 and a first side bottom flap 24. The second end panel 30 is foldably connected to a second end top flap 32 and a second end bottom flap 34. The second side panel 40 is foldably connected to a second side top flap 42 and a second side bottom flap 44. When the carton 190 (FIGS. 3 and 4) is erected, the top flaps 12, 22, 32, 42 close a top of the carton 190, and the bottom flaps 14, 24, 34, 44 close a bottom of the carton 190. The top flaps 12, 22, 32, 42 extend along a first or top marginal area of the multi-ply blank 8, and may be foldably connected at a first longitudinal fold line 62 that extends along the length of the blank 5. The bottom flaps 14, 24, 34, 44 extend along a second or bottom marginal area of the multi-ply blank 8, and may be foldably connected at a second longitudinal fold line 64 that also extends along the length of the multi-ply blank 8. The longitudinal fold lines 62, 64 may be straight fold lines, or may be offset at one or more locations to account for, for example, blank ply thickness or other factors.

The exterior blank 5 includes an exterior tear strip 80 that in part allows the carton 190 (FIGS. 4 and 5) to be divided into two separate sections. The exterior tear strip 80 is formed in the exterior blank 5 and generally does not extend into the interior blank 6. The exterior tear strip 80 is defined by spaced upper and lower breachable lines of disruption 82, 84. The upper and lower breachable lines of disruption 82, 84 extend at least substantially along an entire length of the exterior blank 5. The exterior tear strip 80 includes longitudinal sections 92, 94 that extend longitudinally along the blank 5, and oblique sections 96, 98 that extend obliquely along the blank. One end of the exterior tear strip 80 can include a tab 88 that enables easy grasping of the tear strip. The spaced lines of disruption 82, 84 may be, for example, breachable lines of disruption such as, for example, tear lines. Score lines 86, 87 may be formed above and below the tear lines 82, 84, respectively, to minimize tearing of exterior coatings or layers of the exterior blank 5 during tearing of the strip 80.

Figure 2:
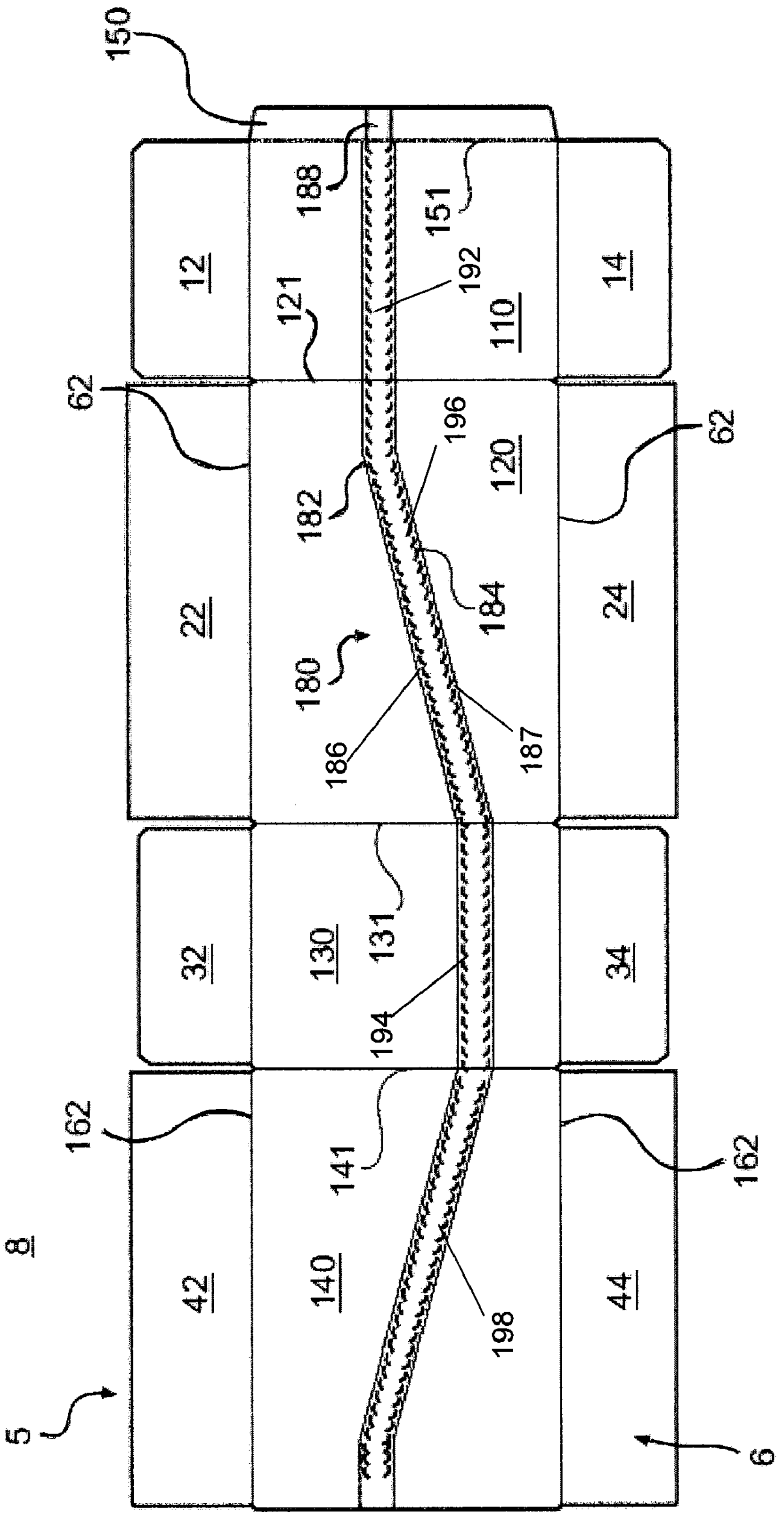
FIG. 2 illustrates the interior side of the multi-ply blank of FIG. 1.

FIG. 2 is a plan view of the interior side of the multi-ply blank 8, in which the reinforcing interior blank 6 is visible. Referring to FIGS. 1 and 2, the height of the reinforcing blank 6 may be selected so that it is substantially equal to or slightly smaller than the distance between the longitudinal fold lines 62, 64 in the exterior blank 5. The interior surface of the interior blank 6 may be adhered to the interior surface of the exterior blank 5 generally between the longitudinal fold lines 62, 64, as will be discussed in further detail below.

The interior blank 6 comprises a first end panel 110 foldably connected to a first side panel 120 at a first transverse fold line 121, a second end panel 130 foldably connected to the first side panel 120 at a second transverse fold line 131, and a second side panel 140 foldably connected to the second end panel 130 at a third transverse fold line 141. An adhesive flap 150 can be foldably connected to the first end panel 110 at a fourth transverse fold line 151. The panels 110, 120, 130, 140, 150 and fold lines 121, 131, 141, 151 are arranged in the interior blank 6 to correspond in shape and location to corresponding panels 10, 20, 30, 40, 50 and fold lines 21, 31, 41, 51 in the exterior blank 5. Fold lines and other lines of disruption in the blanks 5, 6, can, for example, be formed by the same processes.

The interior blank 6 includes an interior tear strip 180 that acts in conjunction with the exterior tear strip 80 in the exterior blank 5 to allow the carton 190 (FIGS. 4 and 5) to be divided into two separate sections. The interior tear strip 180 is defined by spaced upper and lower lines of disruption 182, 184 extending across the length of the blank 6. The upper and lower lines of disruption 182, 184 include longitudinally extending sections 192, 194 and obliquely extending sections 196, 198. One end of the interior tear strip 180 can include a tab 188 that enables easy grasping of the tear strip. The sections 188, 192, 194, 196, 198 may each be adhered to a corresponding section 88, 92, 94, 96, 98, respectively, of the exterior blank tear strip 80, as will be discussed in further detail below. The lines of disruption 182, 184 may be, for example, breachable lines of disruption such as tear lines. Score lines 186, 187 may be formed above and below the tear lines 182, 184.

A method of forming the multi-ply blank 8 is discussed below with reference to FIG. 3.

Figure 3:
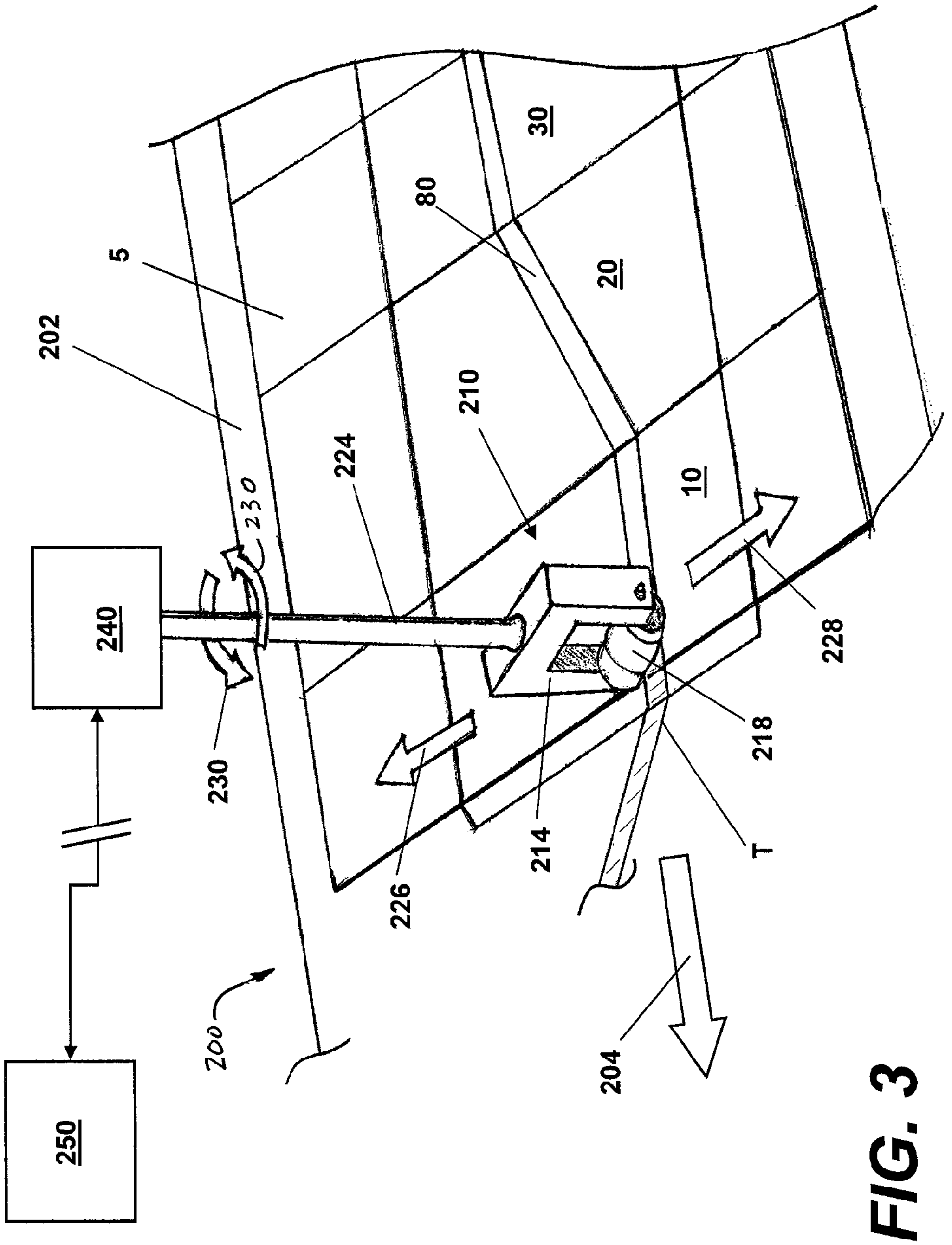
FIG. 3 illustrates an apparatus for forming the blank of FIG. 1.

Referring to FIG. 3, and also to FIGS. 1 and 2, the multi-ply blank 8 may be formed by adhering the interior blank 6 to the exterior blank 5 at one or more selected locations. Before adhering the interior blank 6 to the exterior blank 5, adhesive, in the form of glue, tape, and other adhesive media or substances can be applied to the exterior blank 5. The adhesive used to adhere the panels 10, 20, 30, 40, 50 of the blank 5 to the panels 110, 120, 130, 140, 150 of the blank 6 may be applied in the form of longitudinally (i.e., along the machine direction or in the direction of the arrow 204 in FIG. 3) extending strips (not illustrated), for example.

Conventional application techniques, however, may be insufficient for applying adhesive, such as adhesive tape, to adhere the exterior tear strip 80 of the exterior blank 5 to the interior tear strip 180 of the interior blank 6. According to one aspect of the present disclosure, a system 200 for applying adhesive allows adhesive to be applied to a feature such as the tear strip 80. The adhesive can be applied such that other parts of the blank 5 are not provided with adhesive, or are applied with adhesive in a separate step and/or by a separate apparatus. Referring to FIG. 3, the system 200 includes an endless conveying device, which may be in the form of a continuous driven belt conveyor 202, that conveys the exterior blank 5 along the machine direction 204. The exterior blank shown in FIG. 3 can be one of a series of exterior blanks arranged end-to-end and conveyed continuously by the belt. Alternatively, adhesive can be applied to individual exterior blanks 5 in a batch process.

The system 200 includes an applicator 210 having a mounting bracket 214 with a roller 218 rotatably mounted therein. The bracket 214 is mounted to a vertically extending shaft 224 connected to an actuator assembly 240 (shown schematically in FIG. 3). The actuator assembly 240 allows for movement of the shaft 224 in the direction of the transverse arrows 226, 228, and for rotation of the shaft 224 about a vertical axis as indicated by the arrows 230. The roller 218 may be accordingly moved transversely or orthogonally with respect to the machine direction, as well as having its rotational orientation varied as the blank 5 moves beneath the roller 218. The rotational and transverse movements of the roller 218 allow adhesive, in the form of adhesive tape T, for example, to be unrolled from the roller 218 onto both the longitudinal sections 92, 94 and the oblique sections 96, 98 of the tear strip 80. Operation of the actuator assembly 240 can be coupled to a controller 250, which may have the form of a microprocessor, a programmable logic controller, and/or other suitable devices, etc. Curvilinear, arched, etc. adhesive patterns can also be formed on the blank surface by, for example, combining rotation and transverse movement of the shaft 224.

In accordance with the exemplary embodiment of this disclosure, the schematically shown actuator assembly 240 can be in the form of a movable carriage that is supported by and moves along a transverse rail or other suitable carrying device that extends above and transversely across the continuous driven belt 202. The transverse rail is typically stationary, with the continuous driven belt 202 moving thereunder. The carriage includes a conventional drive motor assembly (which is controlled by the controller 250) for propelling the carriage back and forth along the transverse rail in the direction of the transverse arrows 226, 228. The shaft 224 is typically mounted to the carriage for being rotated about the vertical axis as indicated by the arrows 230. In one version of the exemplary embodiment, a second conventional drive motor assembly (which is controlled by the controller 250) is provided for causing the rotation of the shaft 224 about the vertical axis as indicated by the arrows 230.

In another version of the exemplary embodiment, the second conventional drive motor assembly is omitted, and a cam assembly is provided for causing the rotation of the shaft 224 about the vertical axis as indicated by the arrows 230. The cam assembly includes one or more cams (e.g., cam tracks) that extend generally along (e.g., that are mounted to or defined by) the transverse rail, and one or more cam followers that are operatively connected to (e.g., directly connected to or otherwise linked to) the vertical shaft 224. The cam assembly may be configured so that, in response to the carriage being driven along the transverse rail, the interaction between the cam(s) and the can follower(s) causes the shaft 224 to rotate about the vertical axis as indicated by the arrows 230, so that the path that the tape T follows is coincident with the path of the tear strip 80 and the tape T is applied along the tear strip 80. That is, the controller 250 controls the motor assembly for propelling the carriage back and forth along the transverse rail in the direction of the transverse arrows 226, 228, while the cam assembly causes the shaft 224 to rotate about the vertical axis as indicated by the arrows 230, so that the path of the tape T follows or is coincident with the path of the tear strip 80, and the tape T is applied along the tear strip 80.

Although the bracket 214 is illustrated as fixedly mounted to the shaft 224, the bracket 214 may alternatively be rotatably mounted to the shaft 224, and the cam assembly may be operatively associated with the bracket 214, so that the bracket 214 is rotated relative to the shaft 224 about the vertical axis as indicated by the arrows 230. More generally, the path of travel of the roller 218 can be made to follow the path of the tear strip 80 (so that the tape T is applied along the tear strip 80) in any suitable manner. Also, the shaft 224, bracket 214 and/or roller 218 may be mounted for moving upwardly and downwardly, with one or more springs or other suitable devices being provided to keep the roller 218 engaged to the blank as the diameter of the roller 218 decreases in response to the tape T being unrolled therefrom.

The remainder of the interior side of the interior blank 6 can be joined to a central portion of the interior side of the exterior blank 5 across essentially any or all of the remaining overlapping surface areas of the blanks 5, 6. The length of the first and second blanks 5, 6, measured from left to right in FIG. 3, can be substantially equal. The height of the inner blank 6 may be selected so that it is substantially equal to or slightly smaller than the distance between the longitudinal fold lines 62, 64 in the outer blank 5. The inner blank 6 is adhered to the interior surface of the outer blank 5 generally between the fold lines 62, 64 so that the panels 110, 120, 130, 140, 150 in the inner blank 6 are aligned with the panels 10, 20, 30, 40, 50, respectively, in the exterior blank 5. Adhesive used to apply these sections may be applied as longitudinal strips of adhesive tape, glue, or other forms of adhesive, for example. Such adhesive can be applied using conventional apparatuses for applying adhesive strips.

After applying the various sections of adhesive to the exterior blank 5, the interior blank 6 can be joined to the exterior blank 5 by passing the blanks 5, 6 through a pair of rollers, or by otherwise subjecting the blanks 5, 6 to compression and/or the application of heat. With adhesive applied along the majority of the exterior tear strip 80, including its oblique and longitudinal sections, the exterior tear strip 80 may be adhered to the interior tear strip 180 in the interior blank 6 so that they may be removed in a single step.

The adhesive application steps discussed above describe adhesive applied to the exterior blank 5 and the interior blank 6 subsequently adhered thereto. Adhesive may also be applied alternatively to or in addition to the interior blank.

In the method described with reference to FIG. 3, the exterior blank 5 is shown with lines of disruption forming the fold lines, tear lines, etc. present in the blank 5 before the adhesive application process. The adhesive used to adhere the blanks 5 and 6 could, however, be applied before forming some or all of the lines of disruptions in the blanks. In this embodiment, the blanks 5 and 6 would be adhered together using an adhesive pattern applied by the applicator 210 and any desired additional patterns, and then joined together using the adhesive. The joined blanks 5 and 6 are then provided with lines of disruption defining fold lines, tear lines, etc. in both blanks.

After forming the multi-ply blank 8, the carton 190 can be erected by folding the multi-ply blank 8 flat at the fold lines 41, 141 and 21, 121 and adhering the exterior of the adhesive flap 150 to the interior surface of the first end panel 10. Glue, for example, or other adhesives, or other means, may be used to secure the adhesive flap 150 to the panel 10. The blank 8 can now be opened up into a generally tubular form. The end bottom flaps 14, 34 are folded inwardly and the side bottom flaps 24, 44 are folded inwardly and adhered thereto to close the bottom of the carton. The end top flaps 12, 32 are folded inwardly and the side bottom flaps 22, 42 are folded inwardly and adhered thereto to close the top of the carton.

Figure 4:
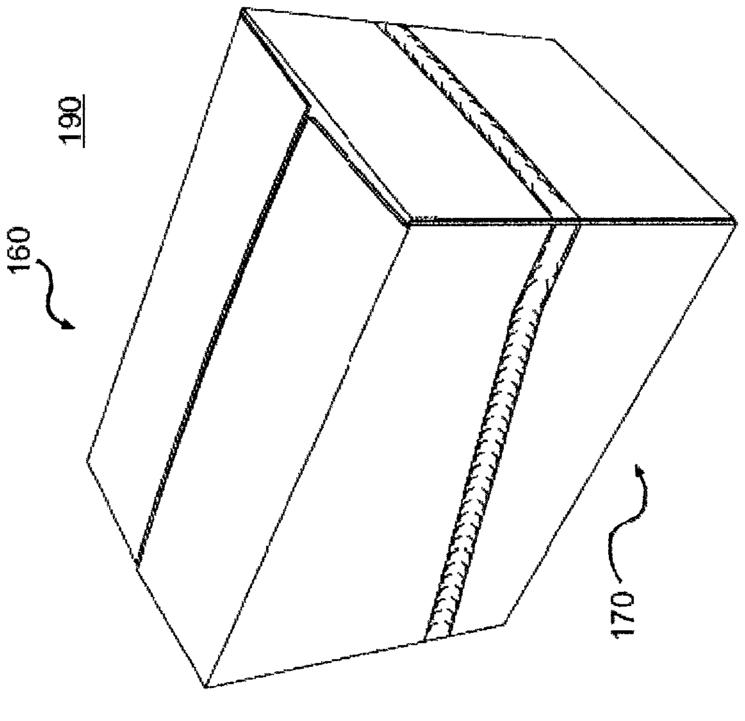
FIGS. 4 and 5 illustrate the carton according to the first embodiment.
Figure 5:
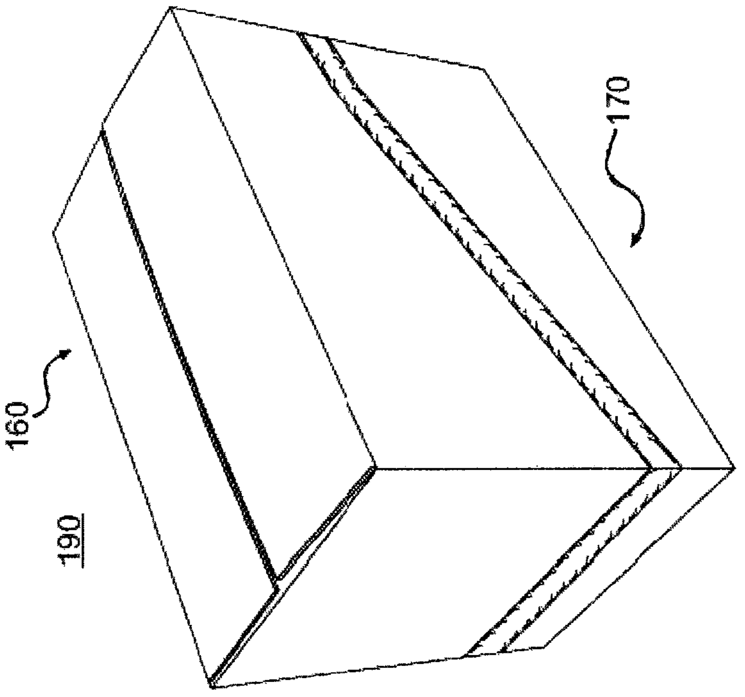

FIGS. 4 and 5 illustrate the erected carton 190 with its top and bottom ends closed. The adhered top flaps 12, 22, 32, 42 form a top panel 160 and the adhered bottom flaps 14, 24, 34, 44 form a bottom panel 170. Product, such as particulate matter, discrete articles, or other items or goods, may be packed into the carton 190 at any time before closing the top and/or bottom ends of the carton 190. The overlapping tear strips 80, 180 extend around the entire perimeter of the carton 190 (the interior tear strip 180 is not visible in FIGS. 4 and 5).

Figure 6:
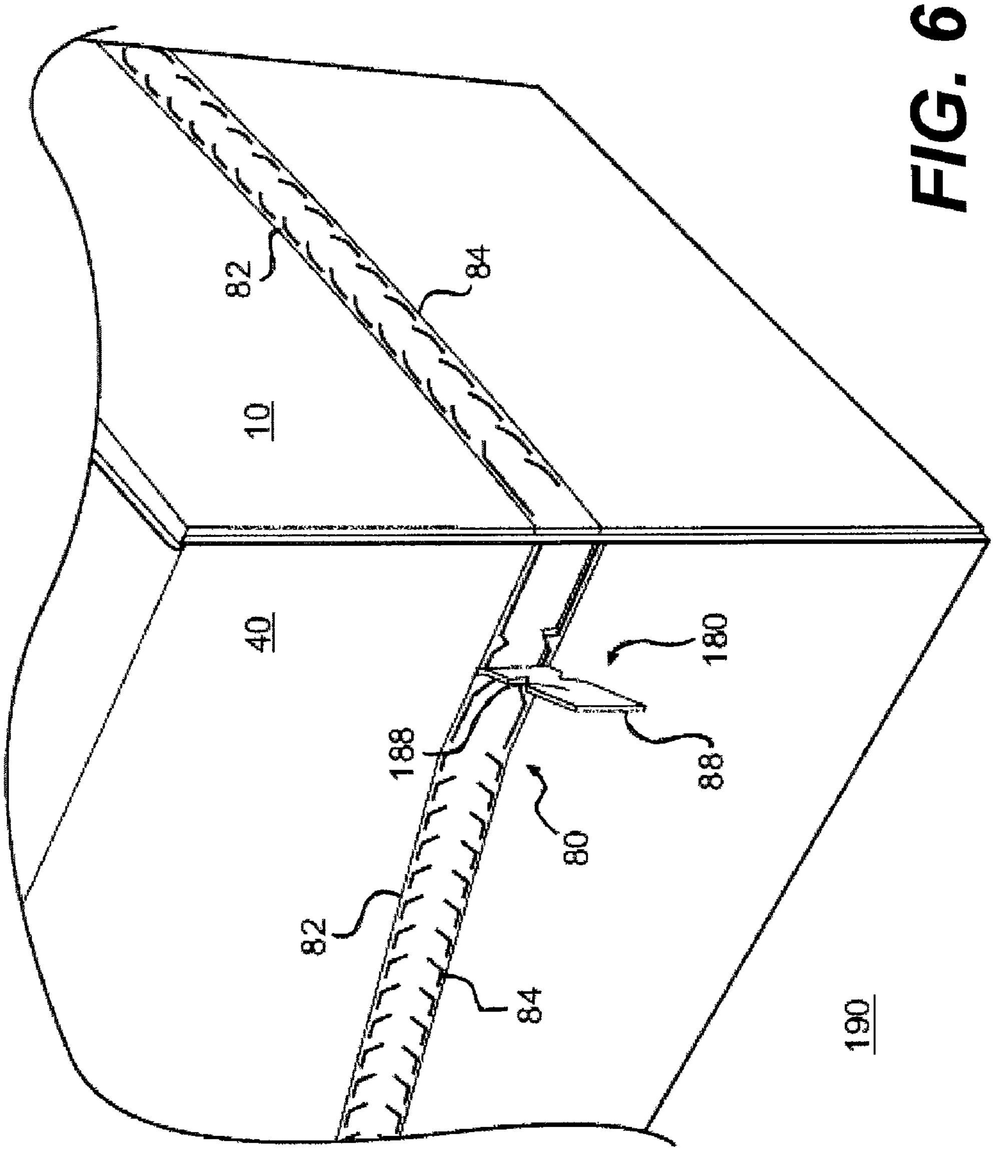
FIG. 6 illustrates the carton being opened at a tear strip.
Figure 7:
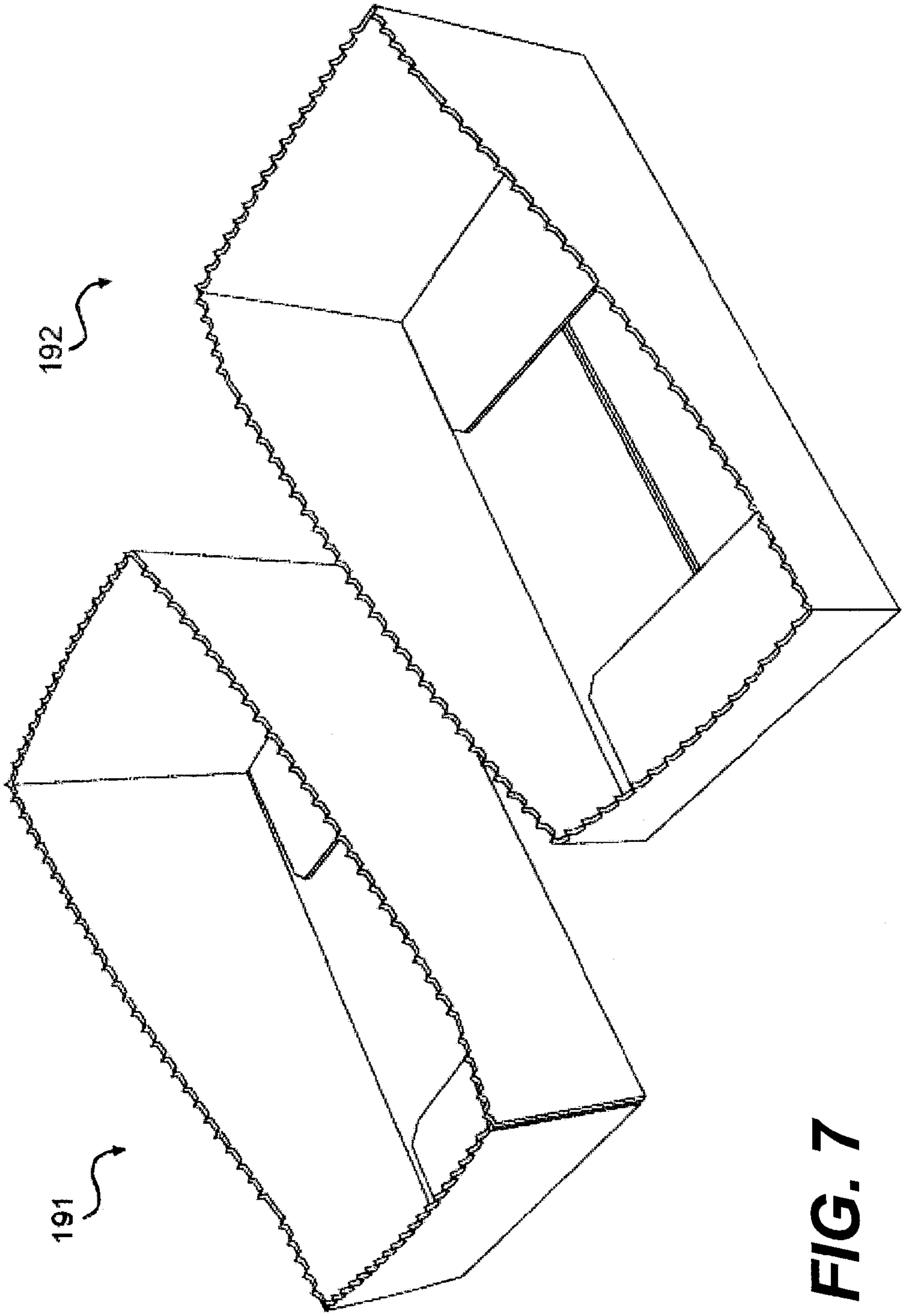
FIG. 7 illustrates two separate carton sections formed by opening the carton.

The carton 190 may be separated into two individual sections at the overlapping tear strips 80, 180. Referring to FIG. 6, the overlapping tear strips 80, 180 may be grasped at their respective tabs 88, 188 to initiate opening of the carton 190. As discussed above, the tear strips 80, 180 of the blanks 5 and 6 may be adhered together so that they can be removed in a single tearing step. Referring also to FIG. 7, the tear strips 80, 180 are torn around the perimeter of the carton 190 to separate the carton into two sections 191, 192. Each of the carton sections 191, 192 can be used, for example, to display articles or other product accommodated in the carton 190. After display, the first section 191 can be used as, for example, a removable lid for the second section 192. Alternatively, the second section 192 can be used as a removable lid for the first section 191. Product can therefore be displayed in one or both of the sections 191, 192 and then stored in the carton 190 by rejoining the first section 191 on the second section 192. The carton 190 may have a relatively high strength in vertical axial compression due to the interior reinforcing blank 6, which acts as an interior liner or sleeve for the carton.

Generally described and in accordance with the exemplary embodiment of the present disclosure, the controller 250 may include appropriate input and output devices, a processor, memory, etc. The controller 250 includes or is otherwise associated with one or more computer-readable media (e.g., volatile memory and/or nonvolatile memory and/or one or more other storage devices such as, but not limited to, tapes and hard disks such as floppy disks and compact disks) having computer-executable instructions (e.g., one or more software modules or the like), with the computer handling (e.g., processing) the data in the manner indicated by the computer-executable instructions.

The illustrated embodiment uses an adhesive tape roll applicator 218 to apply adhesive to a blank surface. The applicator 210 could alternatively be equipped with a nozzle or nozzles for dispensing liquid adhesive therefrom. The nozzles can be translated transversely to the machine direction to apply adhesives, such as hot melt glue, for example, in oblique, curved, and/or transverse patterns to a blank surface. The nozzle or nozzles can be supplied by a liquid adhesive reservoir connected to the nozzle(s) by, hoses, for example. If liquid adhesive is dispensed from the adhesive applicator 210, the rotational movement of the shaft 224 may be omitted. The shaft 224 may be provided with a fitting that enables either nozzle(s) or roll applicator to be interchangeably used in the applicator 210.

According to the above embodiment, an exterior blank can be reinforced at selected locations by one or more reinforcing blanks. The carton formed from the resulting multi-ply blank can accordingly have enhanced strength and rigidity at selected sections of the carton. According to the present disclosure, selected reinforcement of specific areas of the exterior blank can produce a high strength carton while using relatively small amounts of board material.

In accordance with the exemplary embodiment, the gluing and forming methods discussed above may be used to construct blanks from paperboard, for example. The paperboard blanks used to form the blank may be thicker and heavier than ordinary paper. The blanks can also be constructed of other materials, such as cardboard, solid unbleached sulfate (SUS) board, or any other material having properties suitable for enabling the carton to function at least generally as described above.

One or more panels of the blanks discussed above can be coated with varnish, clay, or other materials, either alone or in combination. The coating may then be printed over with product, advertising, nutritional and other information or images. The blanks may also be coated to protect any information printed on the blank. The blanks may be coated with, for example, a moisture barrier layer, on either or both sides of the blanks.

In accordance with the exemplary embodiments, a fold line can be any substantially linear, although not necessarily straight, form of disruption or weakening in the blank that facilitates full or partial bending or folding therealong. More specifically, but not for the purpose of narrowing the scope of the present disclosure, examples of fold lines include: score lines; crease lines; cut-crease lines; cut-score lines; cut-space lines; and various overlapping and/or sequential combinations of these features.

For purposes of the description presented herein, the term “line of disruption” or “line of weakening” can be used to generally refer to, for example, a cut line, a score line, a crease line, a tear line, or a fold line (or combinations thereof) formed in a blank. A “breachable” line of disruption is a line of disruption that is intended to be breached during ordinary use of the carton. An example of a breachable line of disruption is a tear line. Some or all of the lines of disruption formed in the individual blank plies discussed above can be applied to each individual ply prior to adhering the blank plies, or after the blanks have been joined.

In the present specification, a “panel” or “flap” need not be flat or otherwise planar. A “panel” or “flap” can, for example, comprise a plurality of interconnected generally flat or planar sections.

The term “line” as used herein includes not only straight lines, but also other types of lines such as curved, curvilinear or angularly displaced lines.

The term “foldably” is used to describe general folding or bending between connected panels. The term does not imply the ability to fold to a large degree, such as, for example, a ninety degree or one hundred eighty degree fold. Further, the description “folded flat” does not require an exact 180 degree fold, and allows for bowing, etc. between the folded panels of the blank.

The above embodiments may be described as having one or panels adhered together by glue during erection of the carton embodiments. The term “glue” is intended to encompass all manner of adhesives commonly used to secure carton panels in place.

The description is not intended to limit the disclosure to the form disclosed herein. Also, it is intended that the appended claims be construed to include alternative embodiments, not explicitly defined in the detailed description.

What is claimed is:

1. A method of forming a multi-ply blank, comprising:

moving a first blank along a first direction, wherein the first blank comprises a first tear strip having at least one first oblique section;

applying adhesive to the first blank with an applicator, wherein the applicator is moved along the surface of the first blank in a second direction that is transverse with respect to the first direction as the adhesive is applied, the applicator being moved from a first position to a second position, and the applying adhesive to the first blank comprises applying adhesive tape to the first oblique section of the tear strip; and joining a second blank to the first blank to form a multi-ply blank.

2. The method of claim 1, wherein the applicator includes a roller.

3. The method of claim 1, wherein the adhesive is adhesive tape.

4. The method according to claim 1, wherein the applicator is rotated about an axis as adhesive is applied to the first blank.

5. The method of claim 1, wherein the second blank comprises a second tear strip having at least one second oblique section, and wherein joining the second blank to the first blank comprises adhering the second oblique section to the first oblique section.

6. The method according to claim 1, further comprising applying longitudinal strips of adhesive to the first blank.

7. The method according to claim 1, further comprising forming at least one line of disruption in the multi-ply blank after joining the first and second blanks.

8. A method of forming a multi-ply blank, comprising:

obtaining a first blank, wherein the first blank comprises a first tear strip having at least one first oblique section;

moving the first blank in a first direction;

applying adhesive to the first blank with an applicator, wherein the applicator is moved along the surface of the first blank in a second direction that is transverse relative to the first direction and rotated as the adhesive is applied, the applicator being moved from a first position to a second position, and the applying adhesive to the first blank comprises applying adhesive tape to the first oblique section of the tear strip; and joining a second blank to the first blank to form a multi-ply blank.

9. The method of claim 8, wherein the applicator includes a roller.

10. The method of claim 8, wherein the adhesive is adhesive tape.

11. The method of claim 8, wherein the adhesive is glue.

12. The method according to claim 8, wherein the applicator is rotated about a vertical axis as adhesive is applied to the first blank.

13. The method according to claim 8, wherein the second direction is transverse to a longitudinal axis of the blank, and a vertical axis is orthogonal relative to the first and second directions.

14. The method of claim 8, wherein the second blank comprises a second tear strip having at least second one oblique section, and wherein joining the second blank to the first blank comprises adhering the second oblique section to the first oblique section.

15. The method according to claim 8, further comprising applying longitudinal strips of adhesive to the first blank.

16. The method according to claim 8, further comprising forming at least one line of disruption in the multi-ply blank after joining the first and second blanks.

17. The method of claim 5, wherein the first tear strip has at least one first longitudinal section, and wherein applying adhesive to the first blank comprises applying adhesive tape to the first longitudinal section of the tear strip.

18. The method of claim 17, wherein the second tear strip has a second longitudinal section, and wherein joining the second blank to the first blank comprises adhering the second longitudinal section to the first longitudinal section.

19. The method of claim 17, wherein the first longitudinal section is adjacent the first oblique section.

20. The method of claim 18, wherein the first oblique section is adjacent the second longitudinal section.

21. The method of claim 18, wherein the second longitudinal section is adjacent the second oblique section.

* * * * *